Sept. 15, 1936.　　　R. A. LIGHT ET AL　　　2,054,772
CHECK VALVE
Filed Nov. 23, 1933
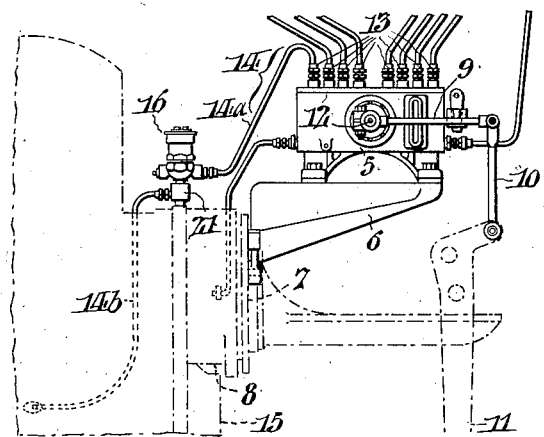
FIG. I.
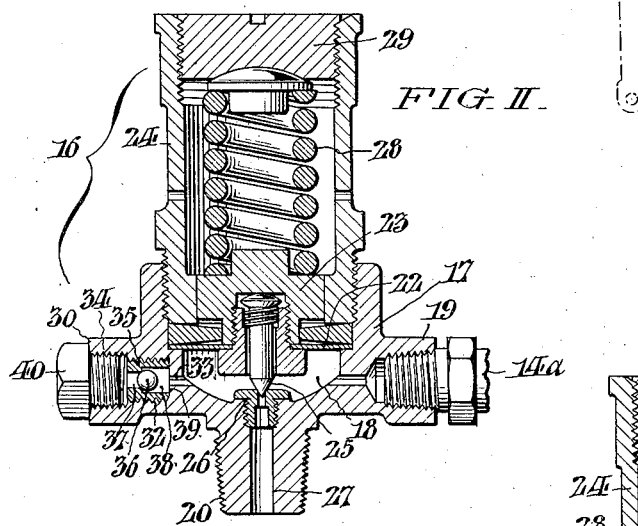
FIG. II.
FIG. III.
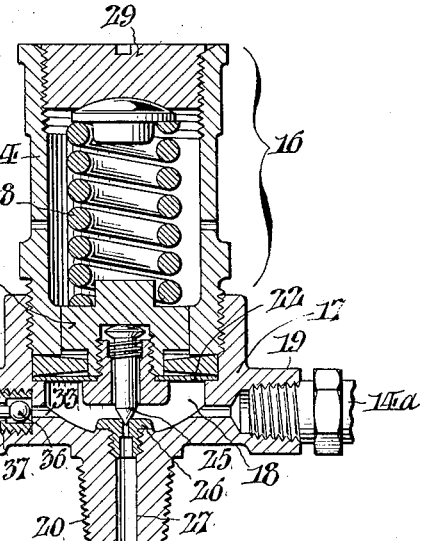
WITNESSES:
John C. Bermer
Woodrow Stevenson
INVENTOR:
Ralph A. Light &
Joseph W. Price Jr.
BY
ATTORNEYS.

Patented Sept. 15, 1936

2,054,772

UNITED STATES PATENT OFFICE 2,054,772

CHECK VALVE

Ralph A. Light, Cynwyd, and Joseph W. Price, Jr., Philadelphia, Pa., assignors to The United States Metallic Packing Company, Philadelphia, Pa., a corporation of Pennsylvania Application November 23, 1933, Serial No. 699,332

1 Claim. (Cl. 284—18)

This invention relates to check valves, and it has more especial reference to what are known as "terminal" valves of the diaphragm type commonly used in forced feed lubrication systems for steam locomotives and the like.

In such lubricating systems, the oil or grease is conducted through individual tubes, from a pump device to the various moving parts of the locomotive, as well as to the locomotive cylinders, and periodically injected into the said parts under pressure. Terminal check valves of the kind with which our invention is particularly concerned are interposed in the individual tubes which lead to the locomotive cylinders, and function during the pressure strokes of the pump device to permit flow of the lubricant into the cylinders, but normally prevent the steam from reacting on the system. Adjustment of the ordinary types of terminal valves for operation at a definite pressure, entails the use of test gauges which are screwed into auxiliary openings in the valve casings subsequent to the removal of screw plugs from said openings. In effecting the interchange between the plug and the pressure gauge, considerable lubricant is discharged from the system and wasted with attendant decrease of pressure in the conducting tubes in which the valves are interposed. Thus, before the tests can be made, it is necessary to operate the pump device of the lubricating system until the normal working pressure is restored in the conducting tubes. Removal of the gauges after adjustment of the check valves, is likewise attended by wastage of lubricant and loss of time in restoring the system to proper working order.

The object of our invention is to overcome the several drawbacks to which attention has been directed, that is to say, we aim to provide in connection with terminal check valves for force-feed lubricating systems, simple means which will make possible the attachment of the test gauges to the valves without wastage of lubricant or drop in the normal operating pressure in any parts of the systems, so that testing and adjustment of the valves may be accomplished with a minimum loss of time.

In the drawing, Fig. I is a fragmentary view of a steam locomotive fitted with a force-feed lubricating system in which a terminal check valve embodying our invention is included.

Fig. II is a view on a larger scale showing the terminal check valve in vertical section; and, Fig. III is a view like Fig. II showing a test gauge attached to the terminal valve.

The lubricating system delineated in Fig. I is of a conventional type, comprising a mechanical pump device 5, which, in this instance, is supported by a bracket 6 attached to the back head 7 of one of the valve chests 8 of the locomotive. The actuating arm 9 of the pump device 5 is oscillated by virtue of a link connection 10 with the combination lever 11 of the locomotive, the motion imparted to the shaft 12 of the oscillating arm 9 being utilized to operate the several pump units 13 of the device 5 in a well known manner. From the several pump units the lubricant is conducted to the various moving parts of the locomotive by way of individual tubes whereof the one designated 14 leads to the locomotive cylinder 15. Interposed in the tube 14 is a terminal check valve 16 which embodies our invention.

Referring now to Figs. II and III wherein the terminal valve 16 is shown on a larger scale and in greater detail, it will be observed that the same is generally speaking of standard construction in that it comprises a bowl-like casing 17 which affords a chamber 18 at the interior thereof. At one side, the valve casing 17 has the usual internally threaded lateral inlet boss 19 for connection of the section 14a of the delivery tube 14; while at its bottom it is formed with an outlet nipple 20 which is externally threaded so that it can be screwed into an adaptor fitting 21 (Fig. I) suitable for the connection of the section 14b of the delivery tube 14. Spanning the chamber 18 within the valve casing 17 is a diaphragm 22 which is responsive to the pressure of the lubricant in the system, and whereto is secured at the center, a piston 23 having guidance in the lower portion of a hollow vertical cylinder 24 screwed into the top of the valve casing 17. As shown, the piston 23 carries a needle 25 which cooperates with a seat 26 at the top of the outlet passage 27 in the nipple 20 to control discharge of the lubricant from the valve 16. A helical spring 28 within the hollow cylinder 24 exerts downward pressure on the piston 23 and the diaphragm 22, and thus functions to normally hold the needle 25 in engagement with its seat 26 in opposition to steam pressure. Also according to customary practice, the vertical cylinder 24 of the valve is closed at the top by a screw plug 29 which serves as an adjustable abutment for the spring 28. In line with the boss 19 and diametrically opposite thereto, the valve casing 17 is formed, as usual, with another hollow lateral boss 30 which affords an auxiliary opening for the purpose of attaching a test gauge such as shown at 31 in Fig. III when the valve 16 is to be adjusted for pressure.

In accordance with our invention, the opening in the boss 30 is stepped, i. e. formed with an intermediate threaded bore 32 between a small diameter inner bore 33 and a threaded large diameter outer bore 34. Screwed into the intermediate threaded bore 32 is a small auxiliary check valve 35 having a closure member 36 in the form of a ball which is normally maintained in closed position over the axial port 37 of said auxiliary valve as shown in Fig. II by the pressure of the lubricant. As illustrated, the ball 36 is confined in a cavity jointly provided by an end hollow 38 in the body of the auxiliary valve 35 and the innermost internal shoulder 39 of the boss 30. To insure against leakage past the auxiliary valve 35 and to prevent entry of dirt or grit, the auxiliary opening is normally protected by a plug 40 (Fig. II) which is screwed into the threaded portion 34 of the outer bore through the boss 30. Also in accordance with our invention, an adapter fitting 41 is provided in permanent association with the gauge 31, the same having a polygonal head 42 for convenience of wrench application, and a threaded shank 43 to fit the large thread bore 34 of the boss 30. As shown, the head of the adapter fitting 41 has a threaded axial cavity 44 at its outer end to receive the screw neck 45 of the test gage 31, an inclined duct 46 leading from the cavity 44, through the shank 43, to the outer confines of an axial projection 47 which extends beyond said shank. Obviously, if desired or found more convenient in practice, the adapter 41 may be integrally formed with the test gauge 31 instead of being made as a separate part after the manner above described.

The operation of our invention is as follows: When the terminal check valve 16 is to be tested, the screw plug 40 (Fig. II) is removed from the boss 30 and the gauge 31, with the adapter 41 attached thereto, substituted in its stead. As the adapter 41 is screwed into place, its end projection 47 enters the port 37 of the auxiliary inset check valve 35 and ultimately unseats the ball 36, thereby permitting the fluid pressure within the terminal check valve 16 to influence the gauge 31. Thereupon, the screw plug 29 at the top of the cylinder 24 forming the movable abutment for the helical spring 28 is adjusted as ordinarily until the desired gauge indication is secured. After the test has been made, the gauge 31 is removed and the screw plug 40 restored to close the auxiliary opening in the boss 30 of the terminal check valve.

From the foregoing it is evident that we have provided a very simple and inexpensive means whereby test gauges may be readily and quickly attached to and removed from terminal check valves of pressure feed lubricating systems without attendant discharge of lubricant or drop in the pressure.

Having thus described our invention, we claim:

In a check valve having a lateral opening including a plain inner constriction with intermediate and outer relatively-stepped screw-threaded sections, a thimble with a ball closure element confined in the intermediate screw-threaded section of the valve lateral opening, said thimble having a stepped bore providing free guidance for and defining a seat for the ball closure element and against which seat said element is normally held outwardly remote from the valve lateral opening plain inner constriction by pressure of the medium passing through the valve entering said inner constriction of the valve latral opening and an adapter-plug having an outer axial cavity for communication into a test gage and a screw-threaded shank for engagement in the valve opening outer threaded-section with provision of an annular-clearance intermediate its inner end and the confronting thimble end, said adapter plug also embodying a substantially-reduced axial projection adapted for free advancement through the thimble valve seating portion to unseat the ball closure element, incident to attachment of the plug, and an inclined longitudinal duct through the adapter-plug affording flow passage between the plug axial cavity and the clearance aforesaid around outer confines of the reduced projection aforesaid.

RALPH A. LIGHT.
JOSEPH W. PRICE, Jr.